Dec. 14, 1926.　　　　　　　　　　　　　　　1,611,145
A. C. HOPKINS
REENFORCING ELEMENT FOR PNEUMATIC TIRE BEADS
Filed August 3, 1925
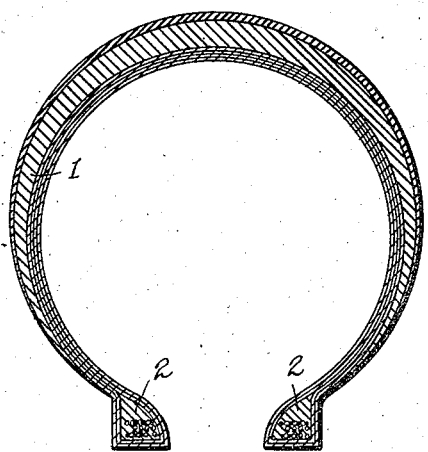
Fig. 1.
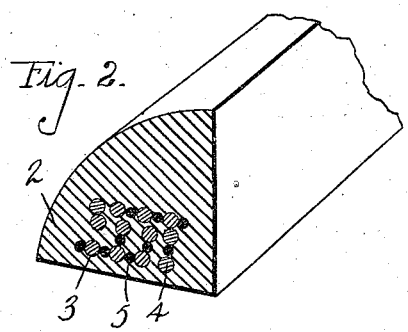
Fig. 2.
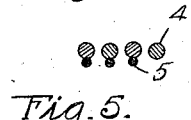
Fig. 4.
Fig. 5.
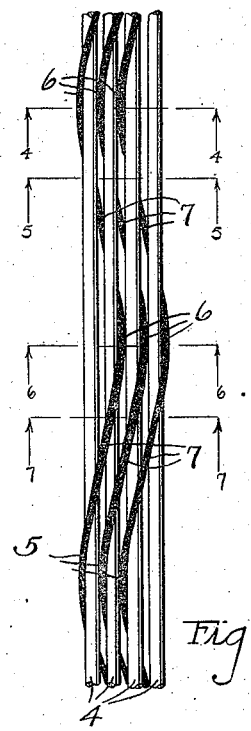
Fig. 3.
Fig. 6.
Fig. 7.
INVENTOR
Arthur C. Hopkins
BY Chappell Earl
ATTORNEYS Patented Dec. 14, 1926.

1,611,145

UNITED STATES PATENT OFFICE.

ARTHUR C. HOPKINS, OF NILES, MICHIGAN, ASSIGNOR TO NATIONAL STANDARD COMPANY, OF NILES, MICHIGAN.

REENFORCING ELEMENT FOR PNEUMATIC-TIRE BEADS.

Application filed August 3, 1925. Serial No. 47,859.

This invention relates to improvements in reenforcing elements for pneumatic tire beads.

The main objects of this invention are:

First, to provide an improved reenforcing element for pneumatic tire beads which is non-stretchable and of great tensile strength.

Second, to provide an improved reenforcing element for tire beads which is well adapted to receive the bonding material and in use has little tendency to place undue stresses thereon.

Objects pertaining to details and economies of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. 1 is a transverse section through a tire including beads embodying my improved reenforcing elements, Fig. 2 is a fragmentary perspective of a tire bead embodying the features of my invention, Fig. 3 is a fragmentary view of my improved tire bead reenforcing element, Fig. 4 is a cross-section on a line corresponding to line 4—4 of Fig. 3, Fig. 5 is a cross-section on a line corresponding to line 5—5 of Fig. 3, Fig. 6 is a cross-section on a line corresponding to line 6—6 of Fig. 3, and Fig. 7 is a cross-section on a line corresponding to line 7—7 of Fig. 3.

In the drawing the sectional views are taken looking in the direction of the little arrows at the ends of the section lines and similar numerals of reference indicate similar parts in all of the views.

In Fig. 1 the tire casing 1 is shown conventionally and is provided with beads 2. The beads 2 are formed of a suitable rubber composition and have my improved reenforcing element, designated generally by the numeral 3, incorporated or embedded therein. This reenforcing element is formed into a coil of the desired number of wraps, three being illustrated.

The reenforcing element comprises a plurality of longitudinal strands 4 disposed parallel, these strands being straight strands, that is, they are not bent or kinked. The strands are bound together and maintained in proper relation by means of the bonding strands 5 which are preferably formed of lighter and soft relatively bendable wire. These bonding strands are for convenience illustrated in full black in the drawings.

The bonding strands are spirally wrapped around adjacent pairs of the longitudinal strands, the bends at 6 between the longitudinal strands and reaches 7 substantially coinciding. The bonding and longtiudinal strands also lie in contact at the points 6 so that the longitudinal strands are held uniformly spaced and cannot collapse together. As the longitudinal strands are substantially straight, their full tensile strength is capable of being utilized and the element is non-stretchable.

Relatively light bonding wires may be used and these conform to the longitudinal strands and there is no tendency for the element to "bead," that is, for the edge longitudinal strands to roll up when under stress or in placing the element. Further, there are no relatively sharp projections as is occasioned by weaving a bonding strand back and forth between longitudinal strands.

I have shown my improved reenforcing element as comprised of four longitudinal strands and three bonding strands but it will be understood that the number of strands may be varied to meet requirements.

Having thus described my invention what I claim as new and desire to secure by Letters Patent is:

1. A tire bead reenforcing element comprising a plurality of longitudinal straight parallel wire strands and a plurality of bonding wire strands successively looped around adjacent pairs of the longitudinal strands with coinciding loops, the reaches of the loops being of substantial length and being in superimposed contact with the longitudinal strands embraced by their loops, the longitudinal and bonding strands being in contact at the bights of the bonding strand loops.

2. A tire bead reenforcing element comprising a plurality of longitudinal parallel wire strands, and a plurality of bonding wire strands spirally wrapped around adjacent pairs of longitudinal strands with coinciding bends between the longitudinal strands and coinciding reaches of substantial length, the longitudinal and bonding strands being in contact at the bends of the bonding strands.

3. A tire bead reenforcing element comprising a plurality of longitudinal parallel wire strands and a plurality of bonding strands successively and alternately looped around adjacent longitudinal strands, so that adjacent strands are engaged by alternate loops of the bonding strands and the longitudinal strands are uniformly and successively bonded together.

4. A tire bead reenforcing element comprising a plurality of relatively straight longitudinal wire strands, and a plurality of bonding strands of wire spirally wrapped around adjacent longitudinal strands with coinciding bends and reaches, the longitudinal and bonding strands being in contact at the bends of the bonding strands.

In witness whereof I have hereunto set my hand.

ARTHUR C. HOPKINS.